United States Patent
Takano et al.

(10) Patent No.: US 7,196,911 B2
(45) Date of Patent: Mar. 27, 2007

(54) DC POWER SOURCE UNIT WITH BATTERY CHARGING FUNCTION

(75) Inventors: Nobuhiro Takano, Hitachinaka (JP); Takao Aradachi, Hitachinaka (JP); Hidekazu Harada, Hitachinaka (JP); Kenrou Ishimaru, Hitachinaka (JP); Takeshi Takeda, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 204 days.

(21) Appl. No.: 10/892,185

(22) Filed: Jul. 16, 2004

(65) Prior Publication Data

US 2005/0013144 A1 Jan. 20, 2005

(30) Foreign Application Priority Data

Jul. 18, 2003 (JP) .......................... P2003-199334

(51) Int. Cl.
*H02M 3/335* (2006.01)
*H02J 7/00* (2006.01)
*H01F 17/00* (2006.01)

(52) U.S. Cl. .................................. 363/21.01; 320/114

(58) Field of Classification Search .................. 363/16, 363/20, 21.01, 21.04, 21.05, 21.09; 320/107, 320/110, 113, 114, 118–120, 149, 152, 157–159, 320/162–164

See application file for complete search history.

(56) References Cited

U.S. PATENT DOCUMENTS

| | | | |
|---|---|---|---|
| 5,623,197 A | 4/1997 | Roseman | |
| 5,689,172 A | 11/1997 | Koyama | |
| 5,973,480 A * | 10/1999 | Takano et al. | 320/152 |
| 6,297,617 B1 * | 10/2001 | Aoyama | 320/128 |
| 6,534,953 B2 * | 3/2003 | Shirakawa | 320/114 |
| 6,566,843 B2 | 5/2003 | Takano | |
| 2002/0060552 A1 * | 5/2002 | Harada et al. | 320/106 |

FOREIGN PATENT DOCUMENTS

| | | |
|---|---|---|
| DE | 19706058 | 8/1997 |
| JP | 5-56566 | 3/1993 |
| JP | 05056566 | 3/1993 |
| JP | 2000-184614 | 6/2000 |

* cited by examiner

*Primary Examiner*—Matthew V. Nguyen
(74) *Attorney, Agent, or Firm*—Antonelli, Terry, Stout and Kraus, LLP.

(57) ABSTRACT

A DC power source unit supplies a DC voltage to a power tool through an adapter when a power switch of the tool is turned ON and also charges a battery pack used as an alternative power source of the tool when the power tool is not operated. In order to prevent a rush current from flowing in a switch interposed between a switching power source circuit and the battery pack when charging the battery pack is commenced, the switch is rendered OFF when the output voltage from the switching power source is greater than the battery voltage. Charging the battery is started upon once lowering the output of the switching power source to a level lower than the battery voltage.

11 Claims, 5 Drawing Sheets

FIG.5

| POWER SOURCE OUTPUT VOLTAGE SET VALUE (V) \ INITIAL BATTERY VOLTAGE (V) | 14.4 | 12.0 | 9.6 | 7.2 |
|---|---|---|---|---|
| V4 (16.0) | Tw 2 (SEC) | 5 | 10 | 15 |
| V3 (13.0) | 0 | 2 | 5 | 10 |
| V2 (11.0) | 0 | 0 | 2 | 5 |
| V1 (8.0) | 0 | 0 | 0 | 2 |

DC POWER SOURCE UNIT WITH BATTERY CHARGING FUNCTION

BACKGROUND OF THE INVENTION

1. Field of the Invention

The present invention relates to a DC power source unit that can selectively charge a battery pack, which is used as a power source for a cordless power tool, and supply DC voltage to the cordless power tool through an adaptor shaped like the battery pack.

2. Description of the Related Art

Cordless power tools are convenient because they can be used anywhere without being restricted by the length of a power cable. However, whenever the battery runs low, the battery pack needs to be removed and charged or else replaced with another battery pack that has already been charged.

A DC power source unit that converts alternating current to direct current can be used along with the battery pack. That is, the DC power source unit can be used when the cordless power tool is to be operated in a single place that has a source of alternating current, and the battery pack can be used when the cordless power tool is to be operated at several different places that have no source of alternating current. However, this situation has a problem in that the operator of the cordless power tool must carry both the DC power source unit and the battery pack's charging unit to the work area.

Japanese Patent Application Publication No. HEI-5-56566 discloses a DC power source unit with a battery charging function. When the DC power source unit detects that the connected power tool is being operated, it supplies power not only to the cordless power tool but also to the battery pack for charging purposes. On the other hand, when the DC power source unit detects that the power tool is not being operated, then it charges a battery pack.

The DC power source unit of the type disclosed in Japanese Patent Application Publication No. HEI-5-56566 is required to immediately supply an appropriate power to the power tool when driven. In order to meet the requirement, a switching power source incorporated in the DC power source unit is controlled to output a constant voltage suitable for the power tool. However, there arises a problem such that the battery to be charged by the DC power source unit has a rated voltage that is not the same as the voltage applied to the power tool. If the battery is charged with the same voltage applied to the power tool that is higher than the rated voltage of the battery, a rush current instantaneously flows in a switch interposed between the switching power source and the battery immediately after the switch is closed. This is due to a voltage difference between the output of the switching power source and the battery voltage. The rush current shortens the service life of the switch.

SUMMARY OF THE INVENTION

In view of the foregoing, it is an object of the present invention to provide a DC power source unit having a battery charging function in which a rush current is prevented from being flowed in a switching device connected between a switching power source and the battery.

To achieve the above and other objects, there is provided a DC power source unit used as a power source of a tool and having a charging function for charging a battery pack used as an alternative power source of the tool. The DC power source unit includes a switching power source circuit, an output voltage detecting circuit, a switch, a battery voltage detecting circuit, a control unit, and an output voltage control circuit. The switching power source circuit generates an output voltage, and the output voltage detecting circuit detects the output voltage generated from the switching power source circuit. The switch is interposed between the switching power source circuit and the battery pack. The output voltage generated from the switching power source circuit is applied to the battery pack when the switch is rendered ON whereas the output voltage generated from the switching power source circuit is not applied to the battery pack when the switch is rendered OFF. The battery voltage detecting circuit detects a battery voltage. The control unit controls ON/OFF switching of the switch based on the output voltage detected by the output voltage detecting circuit and the battery voltage detected by the battery voltage detecting circuit when charging the battery pack is commenced. The control unit generates an instruction to change the output voltage generated from the switching power source circuit. The output voltage control circuit changes the output voltage generated from the switching power source circuit in accordance with the instruction generated from the control unit.

The switch is rendered OFF when the output voltage detected by the output voltage detecting circuit is greater than the battery voltage detected by the battery voltage detecting circuit when charging the battery pack is commenced. The control unit controls the output voltage control circuit to lower the output voltage generated from the switching power source to a level lower than the battery voltage.

It is desirable that the control unit controls the output voltage control circuit to revert the output voltage generated from the switching power source circuit after charging the battery pack is started,

BRIEF DESCRIPTION OF THE DRAWINGS

The above and other objects, features and advantages of the invention will become more apparent from reading the following description of the embodiment taken in connection with the accompanying drawings in which:

FIG. 5 is a table showing examples of a waiting time set in relation with an initial battery voltage and the power source output voltage from the DC power source unit.

DETAILED DESCRIPTION OF THE PREFERRED EMBODIMENTS

A direct current (DC) power source unit according to an embodiment of the present invention will be described while referring to the accompanying drawings.

Figure 1:
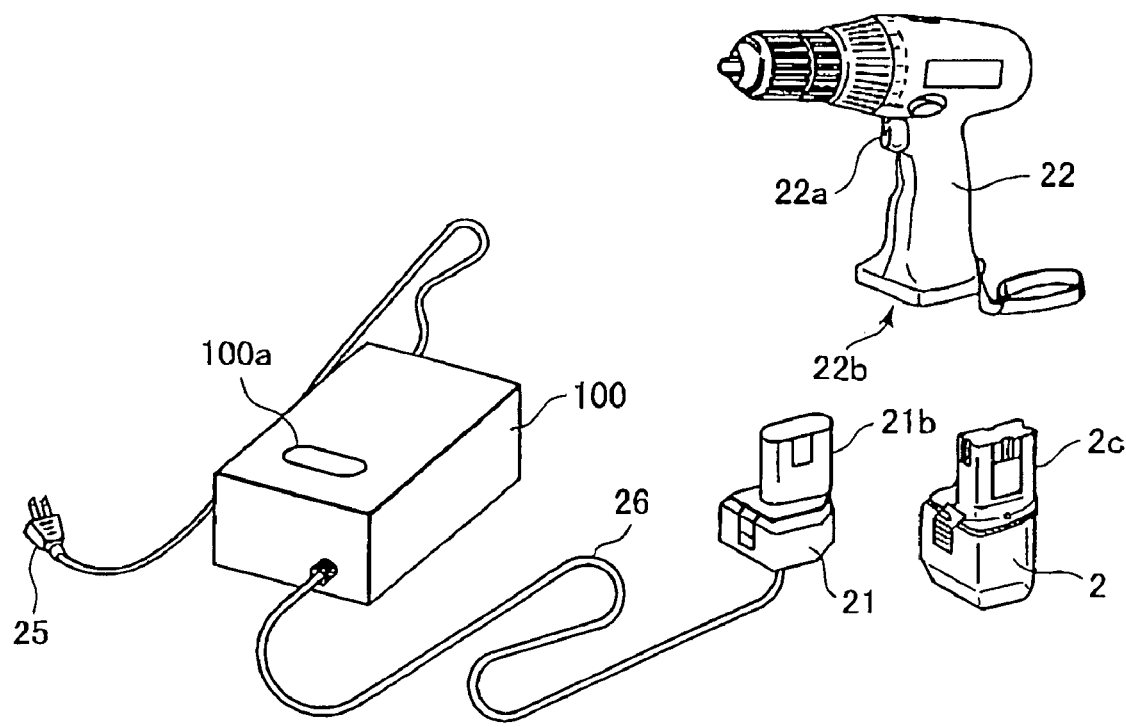
FIG. 1 is a perspective view showing a DC power source unit with a charging function according to an embodiment of the present invention.

As shown in FIG. 1, a cordless power tool 22 is used with selective one of the DC power source unit and a battery pack 2. The cordless power tool 22 includes a power switch 22a.

The battery pack 2 includes an insertion portion 2c that is detachably mountable into a handgrip recess 22b of the cordless power tool 22.

The DC power source unit includes a main unit 100, an AC cord 25, and an adapter 21. The AC cord 25 connects the main unit 100 to a commercial 100V alternating current (AC) power source. Also, an output cable 26 connects the main unit 100 to the adapter 21. The adapter 21 includes an adapter plug 21b which has the same shape as the insertion portion 2c of the battery pack 2. The adapter plug 21b is inserted into the handgrip recess 22b of the cordless power tool 22 in order to supply power to the power tool 22. The main unit 100 has a battery pack insertion recess 100a with the same shape as the handgrip recess 22b of the power tool 22. The insertion portion 2c of the battery pack 2 is inserted into the battery pack insertion recess 100a in order to charge the battery pack 2 in a manner to be described later.

Figure 2:
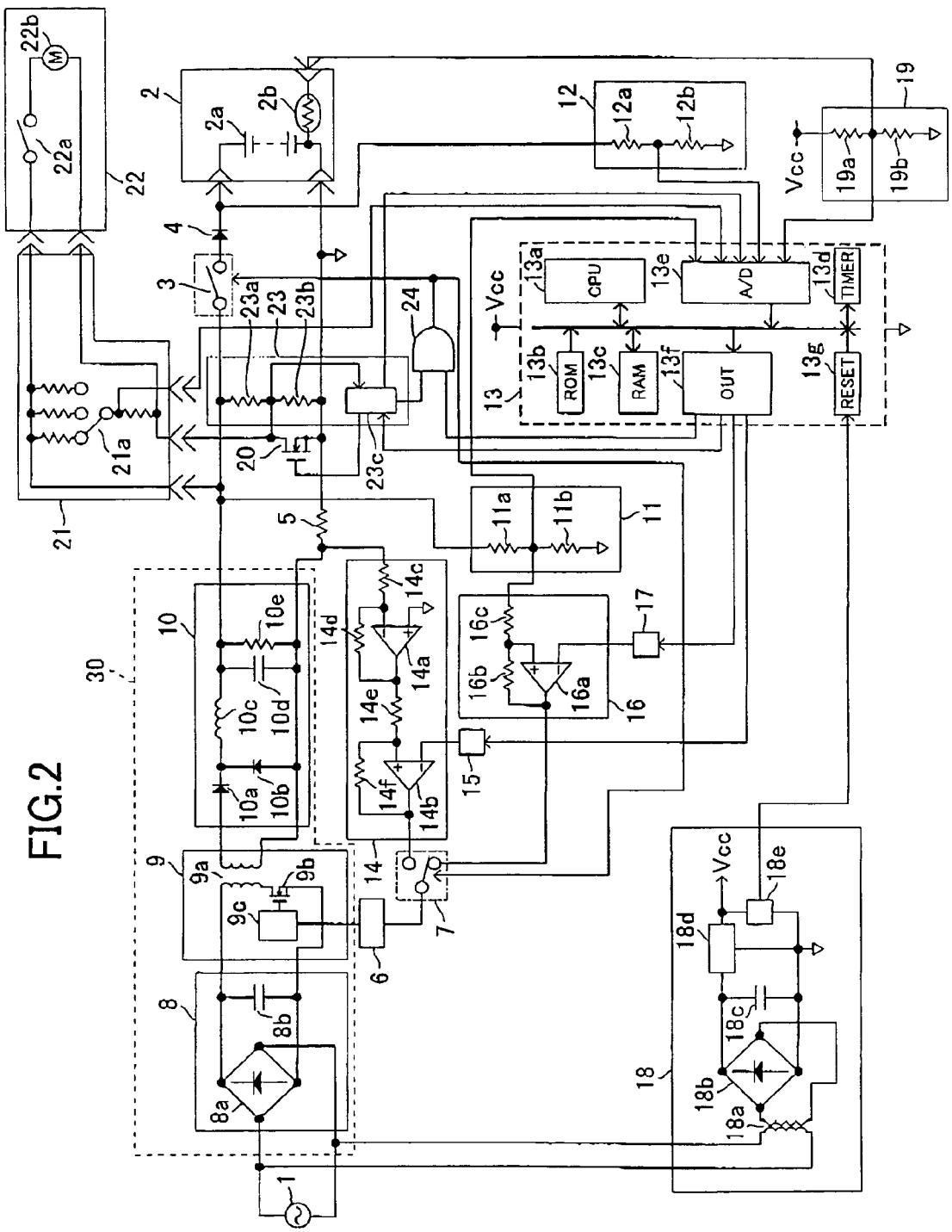
FIG. 2 is a block diagram showing an electrical circuit arrangement of the DC power source unit according to the embodiment of the invention.

Next, electrical circuit arrangements of the main unit 100, the adapter 21, the power tool 22, and the battery pack 2 will be described while referring to FIG. 2.

The battery pack 2 includes a chargeable battery 2a, and a temperature sensor 2b. The battery 2a is composed of a plurality of battery cells connected in series. The temperature sensor 2b is disposed adjacent to or in contact with the battery 2a. A thermistor is, for example, used as the temperature sensor 2b.

The adapter 21 includes an output voltage changeover switch 21a for designating the voltage that corresponds to the rated voltage of the power tool 22 attached to the adapter 21.

The power tool 22 includes a power switch 22a and a DC motor 22b connected in series with the power switch 22a. When the power switch 22a is turned ON, DC power is supplied to the power tool 22 from the main unit 100 through the adapter 21.

The main unit 100 is a computer-controlled device incorporating therein a microcomputer 13. The microcomputer 13 includes a central processing unit (CPU) 13a, a read-only memory (ROM) 13b, a random access memory (RAM) 13c, a timer 13d, an analog-to-digital (A/D) converter 13e, an output port 13f, and a reset input port 13g. The microcomputer 13 implements a variety of different functions in accordance with programs stored in the ROM 13b.

The main unit 100 also includes a switching power source 30. The switching power source 30 is configured from a primary side rectifying/smoothing circuit 8 connected to a commercial 100V AC power source 1, a switching circuit 9 connected to the output of the circuit 8, and a secondary side rectifying/smoothing circuit 10. The primary side rectifying/smoothing circuit 8 includes a full-wave rectifying circuit 8a and a smoothing capacitor 8b. The switching circuit 9 includes a high frequency transformer 9a, a MOSFET 9b and a PWM control IC 9c. The PWM control IC 9c is connected to the gate of the MOSFET 9b for adjusting output voltage and output current supplied from the secondary side rectifying/smoothing circuit 10 by changing width of the pulse applied to the MOSFET 9b. The secondary side rectifying/smoothing circuit 10 includes diodes 10a, 10b, a choke coil 10c, a smoothing capacitor 10d and a discharge resistor 10e connected across the smoothing capacitor 10d.

The main unit 100 further includes a charge current control circuit 14 and a constant voltage control circuit 16. The charge current control circuit 14 has an input side connected to the negative terminal of the battery 2a via a current detecting resistor 5, and an output side connected to the switching circuit 9 via a changeover switch 7 and a photocoupler 6. The circuit 14 includes cascade-connected operational amplifiers 14a and 14b, an input resistor 14c and a feed back resistor 14d of the first-stage operational amplifier 14a, and an input resistor 14e and a feed back resistor 14f of the second-stage operational amplifier 14b. A signal output from the output port 13f of the microcomputer 13 is applied through a charge current setter 15 to the inverting input terminal of the second-stage operational amplifier 14b. The charge current control circuit 14 controls the PWM control IC 9c to adjust the output current to match a value set in the charge current setter 15. The constant voltage control circuit 16 includes an operational amplifier 16a and resistors 16b and 16c. A signal output from the output port 13f of the microcomputer 13 is applied through a voltage setter 17 to the inverting input terminal of the operational amplifier 16a. The constant voltage control circuit 16 controls the PWM control IC 9c to adjust the output voltage to match a value set in the voltage setter 17.

The main unit 100 includes a constant voltage source 18 connected to the commercial 100V AC power source 1 and supplies a positive DC voltage Vcc to the microcomputer 13, and the operational amplifiers in the charge current control circuit 14 and the constant voltage control circuit 16. The constant voltage source 18 includes a power source transformer 18a, a full-wave rectifier circuit 18b, a three-terminal regulator 18d, a smoothening capacitor 18c, and a reset IC 18e. The reset IC 18e is connected to the reset input port 13g of the microcomputer 13.

The changeover switch 7 has a wiper contact that is selectively connected to the outputs of the charge current control circuit 14 and the constant voltage setting circuit 16 and applies a feedback signal from either of the circuits 14 and 16 to the switching circuit 9 via the photocoupler 6. When the output from the charge current control circuit 14 is fed back to the switching circuit 7, the current supplied from the switching power source 30 is maintained at substantially constant. On the other hand, when the output from the constant voltage control circuit 16 is fed back to the switching circuit 9, the voltage output from the switching power source 30 is maintained at substantially constant. The switching of the changeover switch 7 is controlled by the output of an AND gate 24 (to be described later).

The main unit 100 further includes a power source output voltage detecting circuit 11, a battery voltage detecting circuit 12, and a battery temperature detecting circuit 19. The power source output voltage detecting circuit 11 is composed of two resistors 11a and 11b connected in series between the output of the switching power source 30 and ground. The voltage developed across the resistor 11b indicates the output voltage of the switching power source 30. The battery voltage detecting circuit 12 is composed of two resistors 12a and 12b connected in series between the positive terminal of the battery pack 2 and ground. The voltage developed across the resistor 12b indicates the voltage across the battery 2a. The battery temperature detecting circuit 19 is composed of two resistors 19a and 19b connected in series between the positive voltage Vcc and ground. The thermistor 2b is connected in parallel to the resistor 19b, so that the temperature detected by the thermistor 2b is indicated by the voltage developed across the resistor 19b.

The main unit 100 further includes a power source output switch (FET) 20, a trigger detection circuit 23, the AND gate 24, a charge output switch 3, and a diode 4. The trigger detection circuit 23 includes resistors 23a and 23b, and a trigger detector 23c. The resistors 23a and 23b are connected in series across the output of the switching power source 30. The voltage developed across the resistor 23b is applied to the trigger detector 23c. The change in the voltage across the resistor 23b indicates that the power tool 22 is driven. The trigger detector 23c outputs a power source output signal to the FET 20 to turn the latter ON, thereby allowing supply of power to the power tool 22. At the same time, the trigger detector 23c outputs a charge prohibition signal to one input terminal of the AND gate 24. The AND gate has another input terminal to which applied is a charge output ON/OFF signal output from the output port 13f of the microcomputer 13. The AND gate 24 is enabled and closes the charge output switch 3 when the charge prohibition signal is not output from the trigger detector 23c and the charge output ON signal is output from the microcomputer 13. The charge output switch 3 is interposed between the output of the switching power source 30 and the battery pack 2 and is controlled by the output of the AND gate 24. The charge output switch 3, when closed, allows the battery pack 2 to be charged if the power tool 22 is not being used. The charge output switch 3 is, for example, configured from a relay circuit as disclosed in U.S. Pat. No. 6,566,843 which is herein incorporated by reference. The diode 4 is connected between the charge output switch 3 and the battery pack 2 for preventing a current from flowing out from the battery pack 2.

In operation, while the power switch 22a is turned ON to drive the power tool 22, the constant voltage control circuit 16 receives a voltage signal from the power source output voltage detecting circuit 11 that indicates an actual voltage supplied to the power tool 22. The constant voltage control circuit 16 feeds back the voltage signal to the switching circuit 9 via the changeover switch 7 and the photocoupler 6 so that the switching circuit 9 can control the switching duty of the MOSFET 9c to maintain the voltage supplied to the power tool 22 to a level set in the voltage setter 17.

On the other hand, while the power switch 22a is turned OFF and a battery pack 2 is mounted in the main unit 100 for charging, the charge current control circuit 14 receives the current signal from the current detecting resistor 5 and feeds back to the switching circuit 9 via the changeover switch 7 and the photocoupler 6. The switching circuit 9 controls the switching duty of the MOSFET 9b to control the charge current supplied to the battery pack 2 to a level set in the charge current setter 15.

Figure 3:
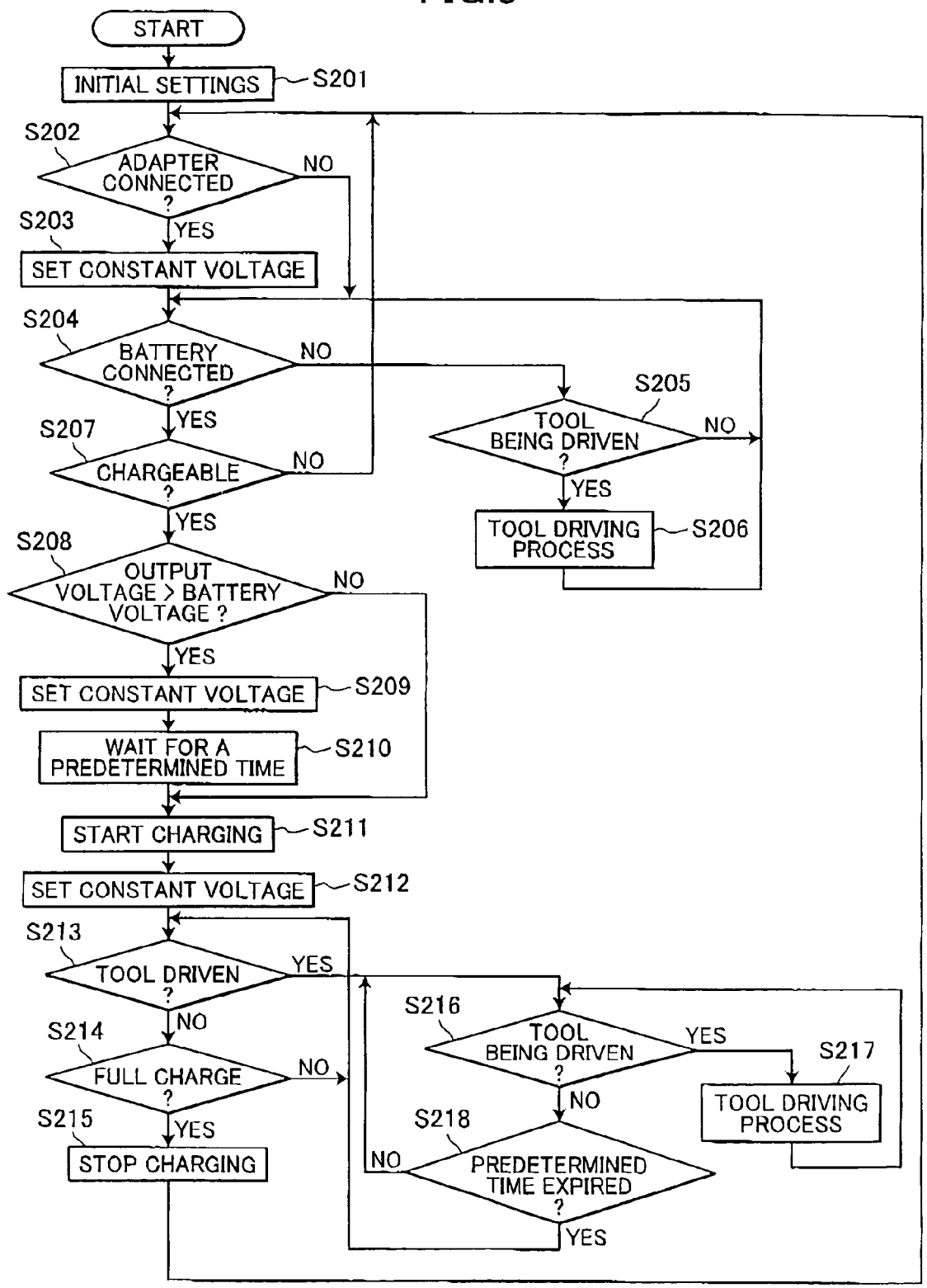
FIG. 3 a flowchart illustrating output power control operations of the DC power source unit when charging a battery with the DC power source unit according to the embodiment of the invention.
Figure 4A:
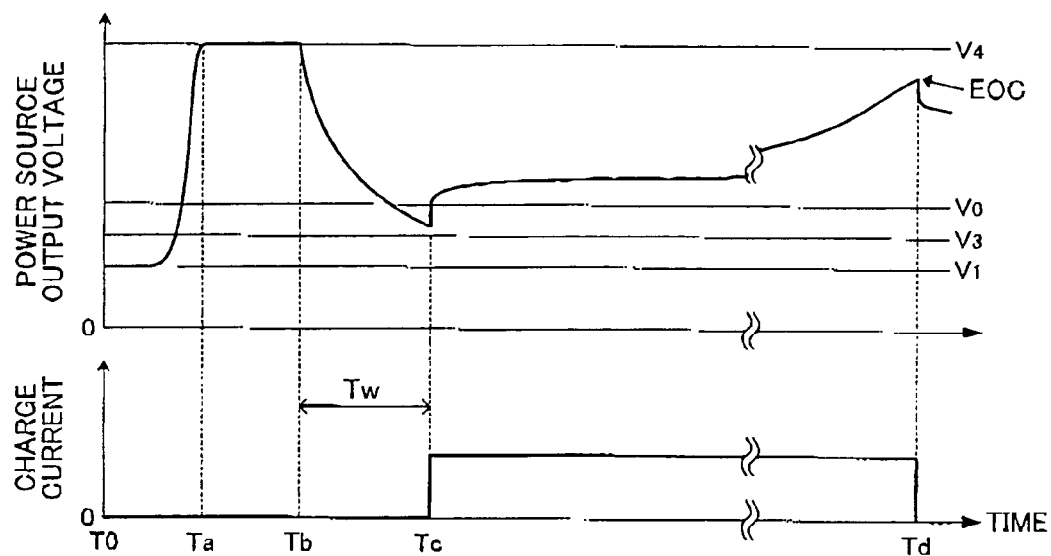
FIG. 4A is a timing chart showing a power source output voltage and a charge current output from the DC power source unit according to the embodiment of the invention.

Next, operation of the DC power source unit 100 when charging the battery pack 2 will be described while referring to the flowchart shown in FIG. 3 and the timing charts shown in FIGS. 4A and 4B.

When the main unit 100 is powered, the microcomputer 13 is reset in accordance with a reset signal generated from the reset IC 18e in the constant voltage source 18 and then executes initial settings (S201). Time T0 in the timing charts of FIG. 4A indicates the time when the initial settings are executed. In the initial settings, a set voltage in the voltage setter 17 is selected so that the output voltage from the switching power source 30 becomes the lowest level V1 (for example, 8 V).

Next, the microcomputer 13 determines whether or not the adapter 21 is connected to the main unit 100 (S202). This determination is made based on the voltage supplied from the adapter 21 to the A/D converter 13e of the microcomputer 13. When the microcomputer 13 determines that the adapter 21 is connected to the main unit 100 (S202:YES), then a set voltage in the constant voltage setter 17 is changed to another set voltage (S203), for example, V4 (16 V). Time Ta in the timing chart of FIG. 4A indicates the time when the set voltage V4 is selected.

Next, the microcomputer 13 determines whether or not the battery pack 2 is loaded in the main unit 100 (S204). This determination is made based on the voltage supplied from the battery voltage detecting circuit 12 to the A/D converter 13e. When the microcomputer 13 determines that the battery pack 2 is not loaded in the main unit 100 (S204:NO), the microcomputer 13 determines whether or not the power tool 22 has been driven based on the output from the trigger detection circuit 23 (S205). When the power tool 22 has been driven (S205:YES), then a power tool driving process is executed (S206), whereupon the routine returns to S204. On the other hand, when the power tool 22 is not driven (S205:NO), the routine also returns to S204.

When it is determined that the battery pack 2 is loaded in the main unit 100 (204:YES), the microcomputer 13 determines whether or not the loaded battery pack 2 is chargeable based on the voltage and temperature of the battery pack 2 (S207). That is, the microcomputer 13 makes this determination based on the outputs from the battery voltage detecting circuit 12 and the battery temperature detecting circuit 19. The battery pack 2 is, for example, determined to be not suitable for charging if the battery temperature is higher than a predetermined temperature. Cycle service life of the battery pack 2, which means an expected number of times the battery pack 2 can be used upon charging, will be shortened if a high temperature battery pack 2 is charged. If the determination made in S207 indicates that the loaded battery pack 2 is chargeable (S207:YES), then the microcomputer 13 further determines whether or not the output voltage from the switching power source 30 is greater than the battery voltage (S208). This determination is made based on the outputs from the battery voltage detecting circuit 12 and the power source output voltage detecting circuit 11. The output from the battery voltage detecting circuit 12 indicates the initial battery voltage that is indicated by V0 in FIGS. 4A and 4B. The output from the power source output voltage detecting circuit 11 indicates a current output voltage supplied from the switching power source 30.

When the power source output voltage is greater than the battery voltage V0 (S208:YES), a set voltage that is lower than the initial battery voltage V0 is selected from four selectable set voltages in the voltage setter 17. FIG. 5 shows four set voltages V1 through V4. In this example, a set voltage V2 (11 V) is selected and set to the voltage setter 17 (S209). The output voltage from the switching power source 30 gradually lowers resulting from changing the set voltage to V2 as shown in a zone from Tb to Tc in the timing chart of FIG. 4A. Note the set voltage is changed to V2 at time Tb.

The microcomputer 13 waits for a certain period of time Tw determined by the set voltage V2 and the initial battery voltage V0 (S210). The table shown in FIG. 5 indicates waiting times Tw in relation to the output voltage set voltage and the initial battery voltage. After expiration of the waiting time Tw, i.e., a duration from time Tb to time Tc, the microcomputer 13 outputs a charge output ON signal from the output port 13f to the AND gate 24 (S211). When the AND gate 24 is enabled, the charge output switch 3 is closed in response to a switch ON signal output from the AND gate 24. At the same time, the changeover switch 7 connects the charge current control circuit 14 to the switching circuit 9 via the photocoupler 6 in response to the switch ON signal. As a result, the switching circuit 9 carries out a constant current control.

When the determination in S208 indicates that the output voltage from the switching power source 30 is lower than the initial battery voltage, the routine jumps to S211 and charging the battery pack 2 is immediately started. When an electromagnetically operated relay is used as the charge output switch 3, the contact of relay closes after expiration of several milliseconds from the generation of the switch ON signal. At this time, the output voltage from the switching power source 30 is lower than the battery voltage. Therefore, a rush current does not flow from the switching power source 30 to the battery pack 2. Further, the diode 4 connected between the charge output switch 3 and the battery pack 2 prevents a reverse directional rush current flowing from the battery pack 2 to the switching power source 30. As such, no influence is exerted upon the electrical components caused by the rush current that flows in the charge output switch 3.

A semiconductor switching element, such as an FET, can alternatively be used as the charge output switch 3. When this type of charge output switch 3 is used, the diode 4 can be dispensed with due to a rectifying capability provided to the semiconductor switching element.

Upon closure of the relay contact at time Tc, charging the battery 2a is started with a constant current set by the charge current setter 15 (S211). After charging the battery pack 2 is started, the set voltage in the voltage setter 17 is reverted to the originally set value V4 (S212) so that the power tool 22 can be driven properly when the power tool 22 is driven during charging the battery 2a. It should be noted that the output of the constant voltage control circuit 16 is not transmitted to the PWM control IC 9c because the wiper contact of the changeover switch 7 is at the side of the charge current control circuit 14.

During charging the battery 2a, the microcomputer 13 monitors the condition of the power tool 22 based on the output from the trigger detection circuit 23 (S213). If the power tool 22 is not driven, charging the battery 2a is continued and the microcomputer 13 determines whether or not the full charge condition of the battery 2a has reached (S214). Various methods for determining the full charge condition of the battery have been well known in the art, such as $-\Delta V$ method, dT/dt method. Briefly, in the $-\Delta V$ method, the battery is determined to be fully charged when the battery voltage drops a predetermined voltage from a peak level. In the dT/dt method, the battery is determined to be fully charged based on a battery temperature gradient. When the battery 2a is determined to be fully charged (S214:YES), then the charge output switch 3 is opened to stop charging (S215), whereupon the routine returns to S202. As shown in FIG. 4A, the end of charge (EOC) occurs at time Td.

When determination made in S213 indicates that the power tool 22 is driven (S213:YES), the microcomputer 13 judges whether or not the power tool 22 is being driven (S216). When the power tool 22 is being driven (S216:YES), the trigger detector 23c outputs the charge prohibition signal to the AND gate 24, thereby opening the charge current switch 3. Also, the power source output switch 20 is closed and the wiper contact of the changeover switch 7 is switched to the side of the constant voltage control circuit 16. Upon completion of those processes, power from the switching power source 30 is supplied to the power tool 22.

The microcomputer 13 can recognize that the power tool 22 is driven based on the output from the output port 13f. While the power tool 22 is being driven, a battery charging operation is not performed but a power tool driving process is executed (S217), whereupon the routine returns to S216. When the power tool 22 is not being driven (S216:NO), the microcomputer 13 waits for a predetermined period of time after driving the power tool 22 is stopped (S218). When the predetermined period of time has expired (S218:YES), then the routine returns to S213 and the microcomputer 13 judges whether or not the power tool 22 is driven. It the power tool 22 is not driven, charging the battery 2 is resumed. When the determination made in S218 indicates that the predetermined period of time has not yet been expired, the routine returns to S216, so that charging the battery is not resumed before expiration of the predetermined period of time.

Figure 4B:
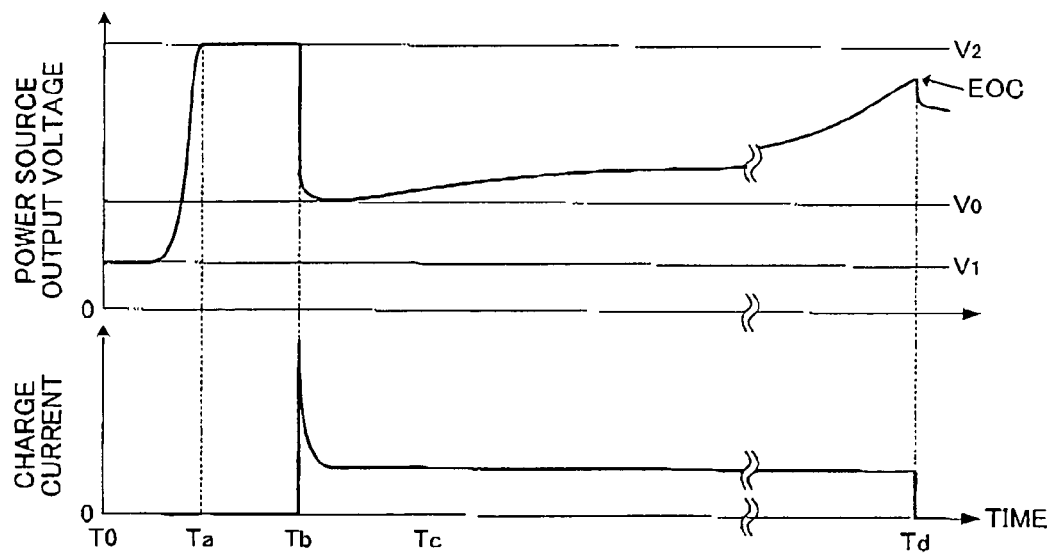
FIG. 4B is a timing chart showing a power source output voltage and a charge current output from a conventional DC power source unit.

FIG. 4B shows change in the power source output voltage and the charge current when the relay contact of the charge output switch 3 is closed while the output voltage of the switching power source 30 is maintained at a level higher than the initial battery voltage. As can be seen from the waveform in FIG. 4B, a rush current flows from the switching power source 30 to the battery pack 2 immediately after the charge output switch 3 is closed. The rush current invites various disadvantages including damage to the relay contact.

According to the embodiment described above, a rush current does not flow in the charge output switch 3 when charging the battery 2a is about to start. Thus, the electrical components including the charge output switch 3 are free from influence of the rush current.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A DC power source unit selectively used for a power source of a tool and for charging a battery pack to be attached to the tool for an alternative power source thereof, the DC power source unit comprising:
   a switching power source circuit that generates a DC output voltage, the output voltage being capable of being set to any level selected from a plurality of levels;
   a first detecting circuit that detects the output voltage of the switching power source circuit;
   a switch connected between the switching power source circuit and the battery pack for selectively applying the output voltage of the switching power source circuit to the battery pack or the tool by way of an adapter;
   a second detecting circuit that detects a battery voltage; and
   a control unit that controls the level of the output voltage of the switching power source circuit in response to detected signals from the first detecting circuit and the second detecting circuit;
   wherein the control unit comprises:
   first judging means for judging whether the adapter is connected to the DC power source unit or not;
   first selecting means for setting an output voltage of the switching power source circuit at a first level when the adapter is connected to the DC power source unit;
   second judging means for judging whether the battery pack is connected or not; and
   second selecting means for setting the output voltage of the switching power source circuit to a second level which is lower than the first level and for charging the battery pack by applying the output voltage set to the second level.

2. A DC power source unit used as a power source of a tool and having a charging function for charging a battery pack used as an alternative power source of the tool, the tool having a power switch, the DC power source unit comprising:
   a switching power source circuit that generates an output voltage;

an output voltage detecting circuit that detects the output voltage generated from the switching power source circuit;

a switch interposed between the switching power source circuit and the battery pack, the output voltage generated from the switching power source circuit being applied to the battery pack when the switch is rendered ON whereas the output voltage generated from the switching power source circuit being not applied to the battery pack when the switch is rendered OFF;

a battery voltage detecting circuit that detects a battery voltage;

a control unit that controls ON/OFF switching of the switch based on the output voltage detected by the output voltage detecting circuit and the battery voltage detected by the battery voltage detecting circuit when charging the battery pack is commenced, the control unit generating an instruction to change the output voltage generated from the switching power source circuit; and an output voltage control circuit that changes the output voltage generated from the switching power source circuit in accordance with the instruction generated from the control unit;

wherein the switch is rendered OFF when the output voltage detected by the output voltage detecting circuit is greater than the battery voltage detected by the battery voltage detecting circuit when charging the battery pack is commenced, the control unit controlling the output voltage control circuit to lower the output voltage generated from the switching power source to a level lower than the battery voltage.

3. The DC power source unit according to claim 2, wherein the control unit further controls the output voltage control circuit to revert the output voltage generated from the switching power source circuit after charging the battery pack is started.

4. The DC power source unit according to claim 3, wherein the control unit starts charging the battery pack after expiration of a predetermined period of time starting with the instruction to lower the output voltage.

5. A DC power source unit selectively used for a power source of a tool and for charging a battery pack to be attached to the tool for an alternative power source thereof, the DC power source unit comprising:

a switching power source circuit that generates a DC output voltage, the output voltage being capable of being set to any level selected from a plurality of levels;

a first detecting circuit that detects the output voltage of the switching power source circuit;

a switch connected between the switching power source circuit and the battery pack for selectively applying the output voltage of the switching power source circuit to the battery pack and the tool by way of an adapter;

a second detecting circuit that detects a battery voltage; and a control unit that controls the level of the output voltage of the switching power source circuit in response to detected signals from the first detecting circuit and the second detecting circuit;

wherein the control unit comprises:

means for judging whether the battery pack is connected or not;

means for comparing the output voltage of the first detecting circuit with the output voltage of the second detecting circuit when the battery pack is connected;

means for setting the output voltage of the switching power source circuit at a level which is lower than the output voltage of the second detecting circuit when the detected output voltage of the first detecting circuit is higher than the detected output voltage of the second detecting circuit; and means for charging the battery pack by applying the set level of the voltage.

6. A DC power source unit selectively used for a power source of a tool and for charging a battery pack to be attached to the tool for an alternative power source thereof, the DC power source unit comprising:

a switching power source circuit that generates a DC output voltage, the output voltage being capable of being set to any level selected from a plurality of levels;

a first detecting circuit that detects the output voltage generated from the switching power source circuit;

a switch connected between the switching power source circuit and the battery pack for selectively applying the output voltage generated from the switching power source circuit to the battery pack or the tool by way of an adapter;

a second detecting circuit that detects a battery voltage; and a control unit that controls the level of the output voltage of the switching power source circuit in response to detected signals from the first detecting circuit and the second detecting circuit;

wherein the control unit comprises:

first means for judging whether the adapter is connected to the DC power source unit or not;

second means for setting an output voltage of the switching power source circuit at a first level when the adapter is connected to the DC power source unit;

third means for judging whether the battery pack is connected or not;

fourth means for comparing the output voltage of the first detecting circuit with the output voltage of the second detecting circuit;

fifth means for setting the output voltage of the switching power source circuit at a second level which is lower than the detected battery voltage when the detected output voltage of the first detecting circuit is higher than the detected output voltage of the second detecting circuit; and sixth means for charging the battery pack by applying the voltage set at the second level by the fourth means.

7. The DC power source unit according to claim 6, wherein the control unit further comprises seventh means for setting the output voltage of the switching power source circuit at the first level after charging by the sixth means.

8. The DC power source unit according to claim 7, wherein the control unit further comprises eighth means for waiting for a predetermined period of time after setting by the fifth means to start the charging by the sixth means.

9. The DC power source unit according to claim 6, wherein the control unit further comprises judging means for judging before the comparing by the fourth means whether the temperature of the battery pack is lower than a predetermined temperature.

10. The DC power source unit according to claim 6, wherein the control unit further comprises setting means for setting before the judging by the first means an output voltage of the switching power source circuit at a third level which is lowest among the plurality of levels of the output voltage thereof.

11. The DC power source unit according to claim 6, wherein the control unit further comprises means for performing the judgment by the third means without setting the output voltage of the switching power source circuit at the second level when the adapter is not connected to the DC power source unit.

* * * * *